TELEPHONE SYSTEM WITH DIGIT-TRANSLATING TRUNK REPEATERS

Filed Nov. 6, 1958 4 Sheets-Sheet 1

TELEPHONE SYSTEM WITH DIGIT-TRANSLATING TRUNK REPEATERS

Filed Nov. 6, 1958

4 Sheets-Sheet 2

Feb. 23, 1960 L. R. CAIN 2,926,218

TELEPHONE SYSTEM WITH DIGIT-TRANSLATING TRUNK REPEATERS

Filed Nov. 6, 1958 4 Sheets-Sheet 3

Feb. 23, 1960 L. R. CAIN 2,926,218

TELEPHONE SYSTEM WITH DIGIT-TRANSLATING TRUNK REPEATERS

Filed Nov. 6, 1958 4 Sheets-Sheet 4

United States Patent Office 2,926,218
Patented Feb. 23, 1960

2,926,218

TELEPHONE SYSTEM WITH DIGIT-TRANSLATING TRUNK REPEATERS

Lester R. Cain, Oak Lawn, Ill., assignor to International Telephone and Telegraph Corporation, New York, N.Y., a corporation of Maryland Application November 6, 1958, Serial No. 772,267

4 Claims. (Cl. 179—16)

This invention relates to a telephone system employing a digit-translating trunk repeater which receives all digit impulse trains from an associated incoming trunk line, translates them into coded information, and transmits such information to digit-registering apparatus common to a number of such repeaters. Its principal object is to provide an economical system of the above character which receives but delays the transmission of digit information until sufficient time has elapsed to insure that the digit-registering apparatus is connected to the repeater.

In multi-exchange telephone systems employing digit-registering apparatus common to all incoming trunk lines, difficulty is often encountered in connecting a calling repeater to idle digit-registering apparatus in time to receive the first impulses of the first digit to be stored. This problem arises when a substantial portion of the interdigit time interval between the routing digit dialed in the distant exchange and the first digit to be received in the called exchange, is consumed by the distant exchange in hunting for, and connecting to, an idle one of the desired trunk lines. When a large number of trunks must be searched, insufficient time remains for the repeater of the called exchange to connect to digit-registering apparatus before the first impulses are received.

Prior-art arrangements overcome this problem by providing stop-dial repeaters which signal the calling party, by suitable tone, when the called exchange is ready to receive its first digit. This arrangement has the disadvantage that the calling party must monitor the connection between dialed digits. Other known arrangements employ by-path switches which substantially reduce the connecting time of the repeaters and digit registering apparatus so that the first impulses of the first digit may be received in the called exchange almost simultaneously with the seizure of the trunk repeater. These arrangements, however, have the disadvantage that considerable additional switching equipment is required in the called exchange to provide this reduced digit-register and repeater connecting time.

According to the present invention, the incoming trunk repeaters are arranged to receive and store the impulses of the first digit immediately after such repeater is seized by the calling exchange. During the time interval that the impulses of the first digit are being received, or after a suitable delay period, the common digit-registering apparatus is connected to the called repeater. Thereafter, during the interdigit time following the received first digit, the stored digit information is transmitted to the connected digit-registering apparatus and stored therein. The repeater is then reconditioned to receive and store the second digit.

A feature of the present invention resides in the arrangement wherein the received digit information is stored in the repeater in decimal form and is translated into coded form for rapid transmission to the digit register.

Another feature resides in the arrangement wherein a single ten-impulse digit store is employed in the repeater and is reused to record each received digit.

Still another feature resides in the translating arrangement wherein the code transmitted to the register is in a form suitable for immediate registration without any further alteration.

The above-mentioned and other features and objects of this invention and the manner of obtaining them will become more apparent and the invention itself will be best understood by reference to the following description of an embodiment of the invention taken in conjunction with the accompanying drawings comprising Figs. 1 to 4 wherein.

Figure 1:
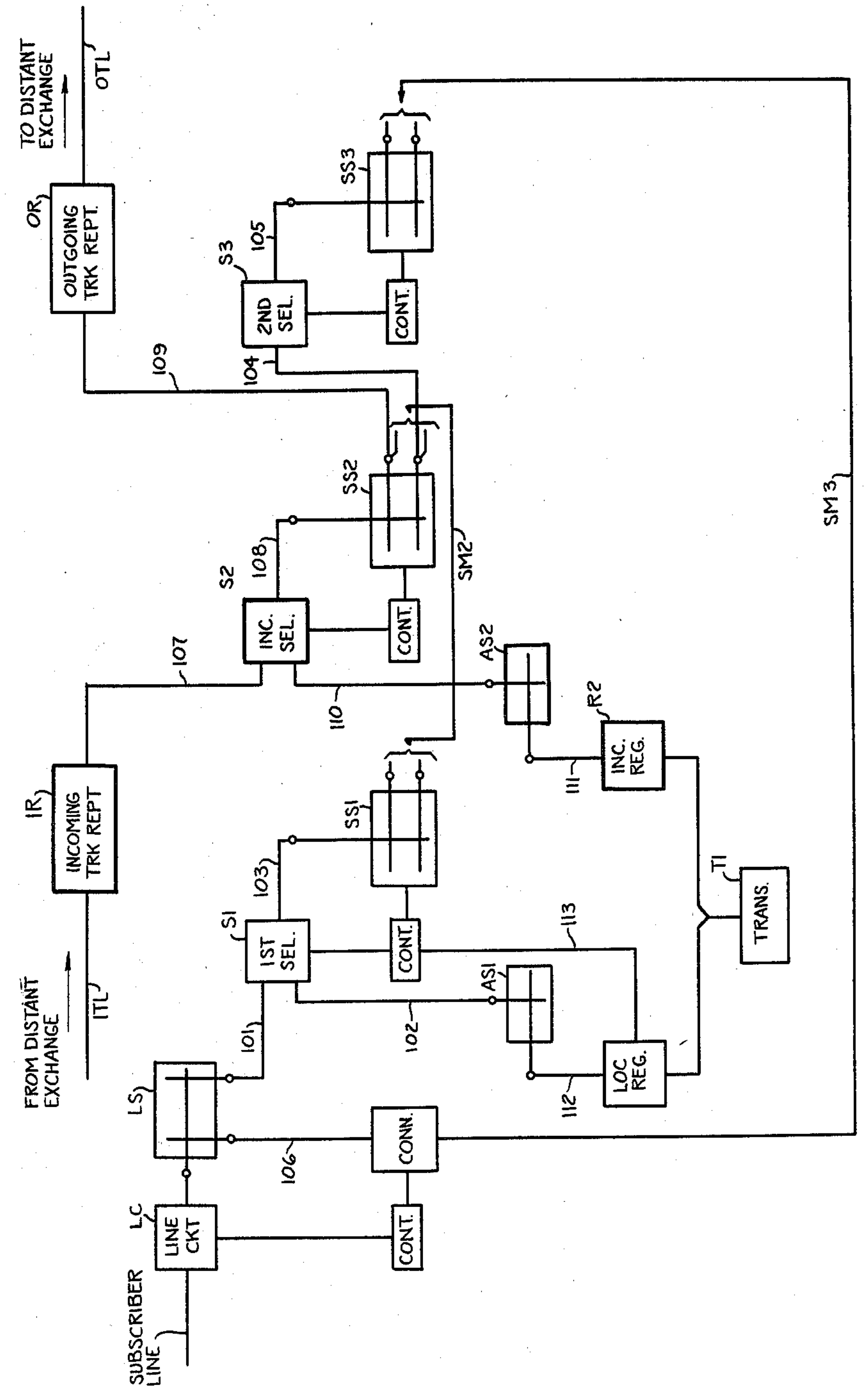
Fig. 1 shows a block-diagram of a telephone exchange embodying the invention.

Referring now in particular to Fig. 1 of the drawings, the telephone exchange shown therein is generally similar to the exchange shown in the U.S. patent application of E. J. Leonard et al. for "A Register-Translator Crossbar Telephone System," Serial No. 629,282, filed December 19, 1956. Except as hereinafter pointed out, the operation of the present invention is similar to the operation of the system disclosed in the above-identified application.

When a subscriber initiates a call, the calling line is connected to an idle local register, such as R1, as a result of normal line-finding action. This path includes line circuit LC, line switch LS, link 101, first selector S1, conductor group 102, register-access switch AS1, and conductor group 112. The register returns dial tone to the subscriber and the desired telephone number is dialed and recorded in the register.

On completion of the dialing of a local number, the stored digit information is transmitted to a translator, such as T1, translated and then returned to the register. Thereafter, the register, in conjunction with the stage controllers CONT, reached over conductors in group 113, causes the connection from the calling line to be further extended, on a stage-by-stage basis, to the called line. For example, such connection could include conductor group 103, selector switch SS1, switch multiple SM2, link 104, second selector S3, conductor group 105, selector switch SS3, multiple SM3, connector CONN, conductor group 106 and the line circuit LC of the called line.

If the calling subscriber dialed the number of a party in a distant exchange, the register after receiving sufficient routing information would transmit control information over conductor group 113 to the first selector controller to cause the connection from the calling line to be extended to the distant exchange. This connection could include conductor group 103, selector switch SS1, selector multiple SM2, conductor group 109, outgoing trunk repeater OR, and outgoing trunk line OTL.

On incoming calls from a distant exchange, the usual closure of the line loop across incoming trunk line ITL prepares incoming trunk repeater IR for receiving the digit impulses from the distant exchange. As will be described in detail hereinafter, during the time repeater IR is storing the incoming impulses, or immediately after such registration, a connection is established from repeater IR to incoming register R2. This path includes conductor group 107, incoming selector S2, conductor group 110, incoming register-access switch AS2 and conductor group 111. On completion of the dialing of the first digit, the digit information is translated and transmitted to incoming register R2 over the described path during the inter-digit time. This operation is repeated for each incoming digit, and register R2, after receiving sufficient routing information for an outgoing call or after receiving the complete digit information for a locally terminated call, functions in the manner described for register R1 in handling similar calls.

Figure 2:
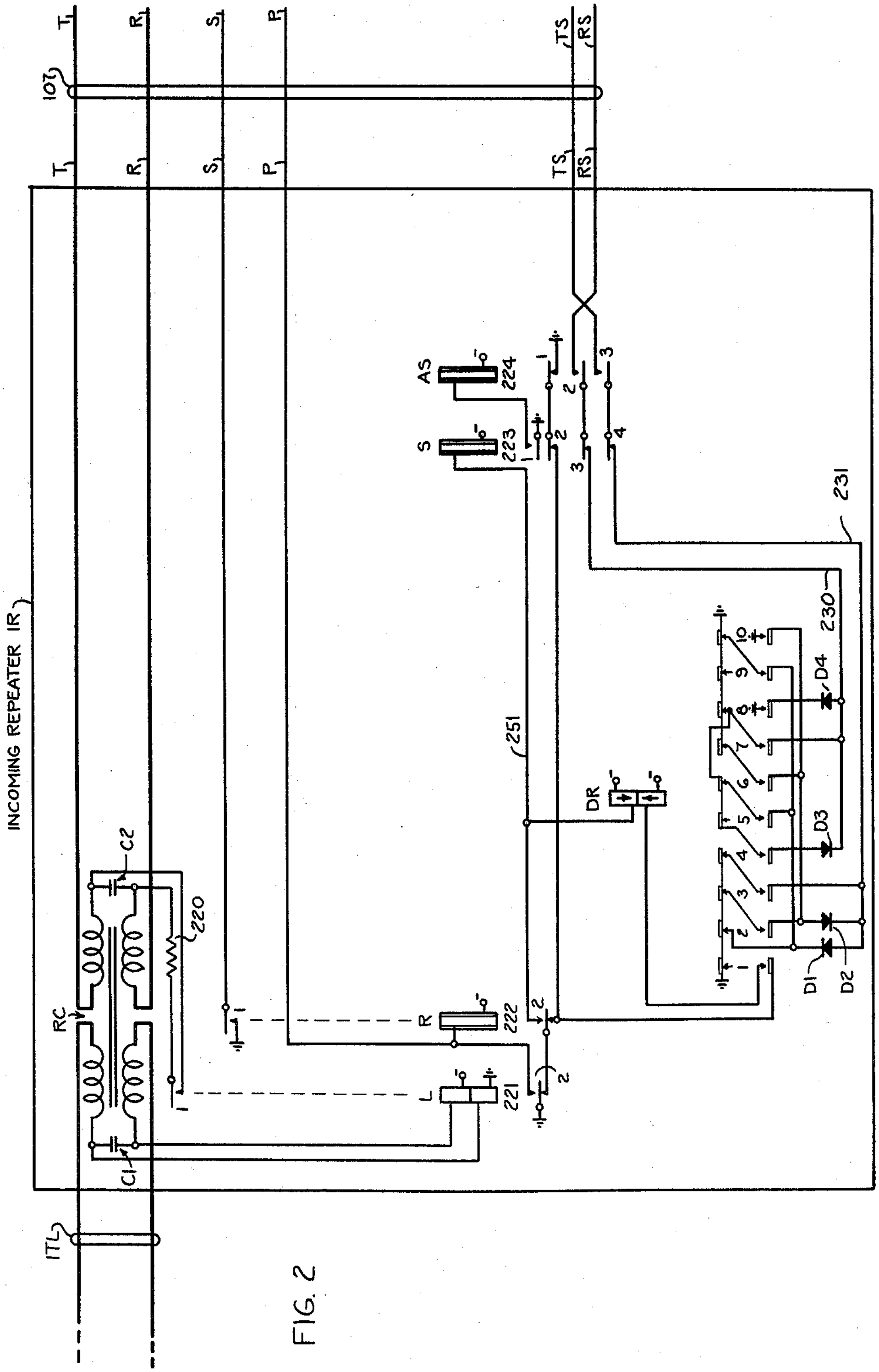
Fig. 2 shows a circuit diagram of a trunk-line repeater of the exchange of Fig. 1, arranged to receive and store incoming digit information.
Figure 3:
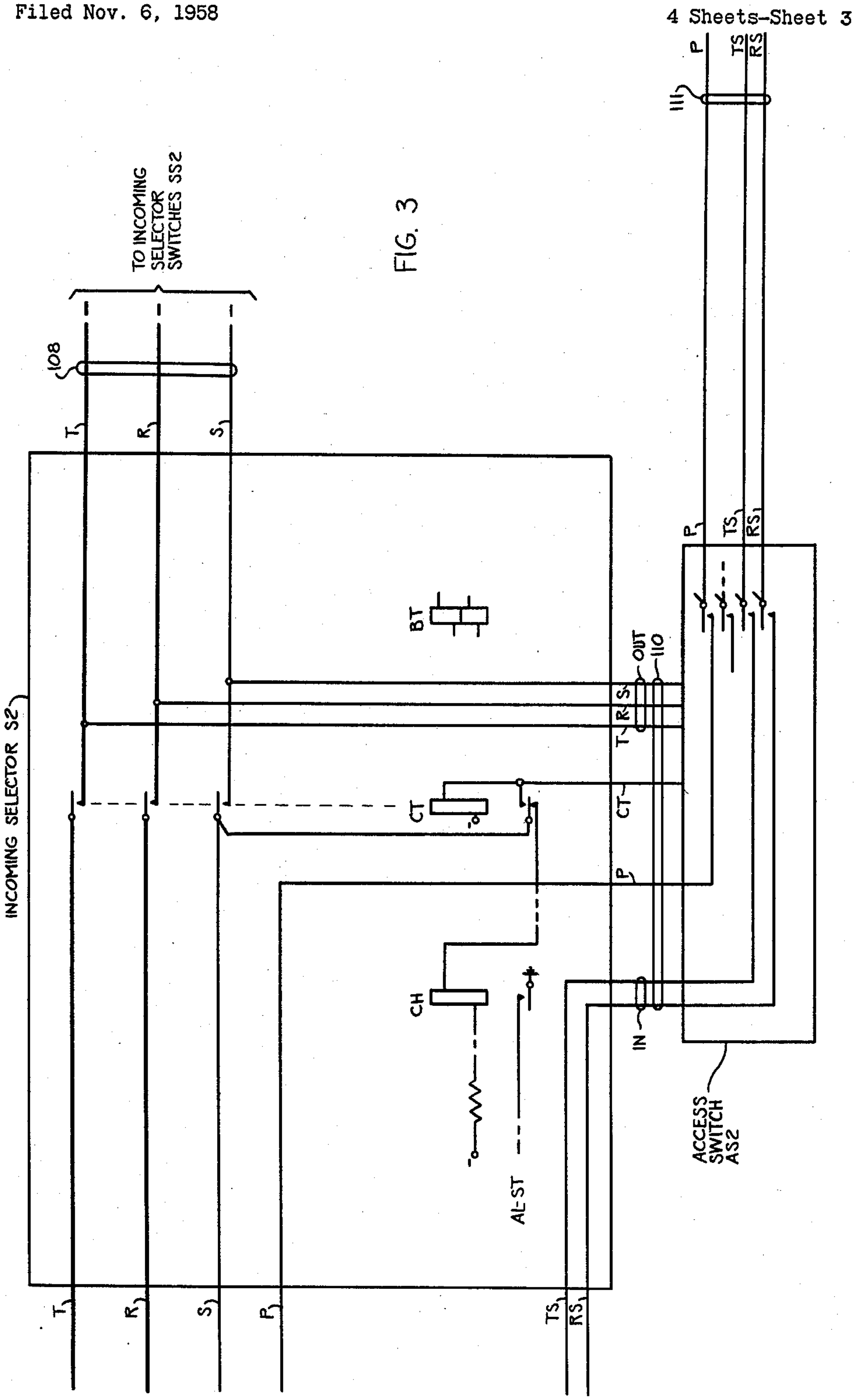
Fig. 3 show a circuit diagram of a portion of an incoming selector associated with the repeater of Fig. 2 and also shows a circuit diagram of a portion of a digit-register access switch.
Figure 4:
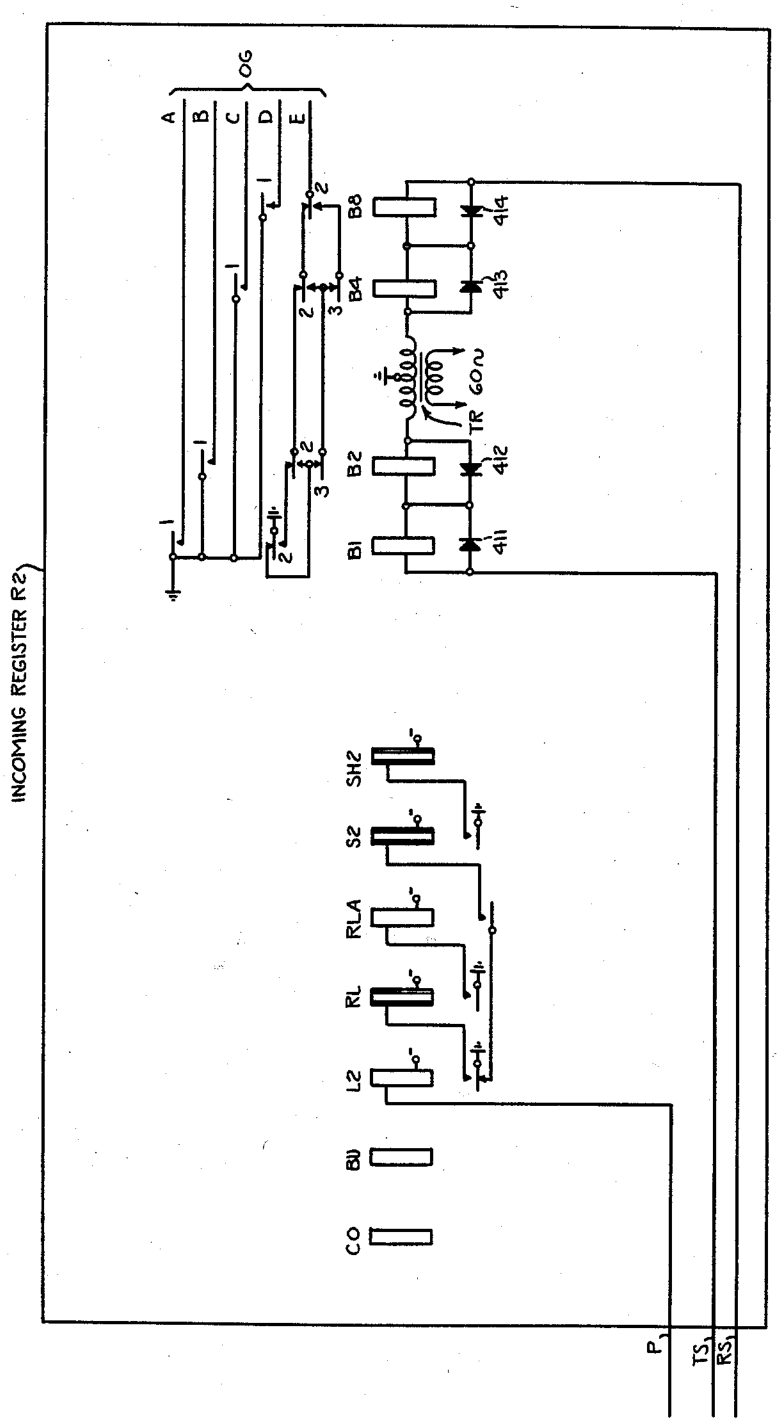
Fig. 4 shows a circuit diagram of a portion of the incoming digit register of the exchange of Fig. 1.

Referring to Figs. 2 to 4, the operation of the system in receiving an incoming trunk-line call and in storing the digit information thereof in the incoming register will now be described in detail.

When incoming trunk line ITL is seized by a distant exchange in extending a call to repeater IR, line relay 221 operates in the well-known manner from battery and ground on the windings thereof. Contacts 2 of relay 221 energize the winding of relay 222 and ground wire P. Release relay 222 operates, at its contacts 1, grounds the sleeve wire S and at its contacts 2, prepares an operate circuit for relay S and for impulse counter DR.

The ground on wire S of conductor group 107 is extended through all selectors in the group of selectors associated with the incoming registers serving selector S2 and through the access switch of the concerned registers. If a path is complete therethrough, indicating that selector S2 can be connected to an idle register R2, chain relay CH of selector S2 is operated. Contacts (not shown) on relay CH cause operations to occur to connect selector S2 to an idle register R2 through access-switch AS2. This operation is similar to that described in the noted Leonard et al. application. At such time, wires RS and TS of repeater IR are connected to respective wires RS and TS of incoming register R2 and grounded wire P of repeater IR is connected to the associated P wire of register R2. Relay L2 of R2 operates and operates relays RL and RLA sequentially, these relays, and the functions thereof, corresponding respectively to the register relays in the noted Leonard et al. application and their functions. If desired, the grounding wire S to selector S2 may be delayed until the entire digit is stored in order to reduce the register holding time. This may be accomplished by controlling the ground on contacts 1 of relay R through contacts on relay S and AS similar to the control over wires TS and RS.

While the above-described register-accessing function is being performed, or shortly thereafter, depending upon the interdigit time remaining after seizure of the repeater, the impulses of the first digit are transmitted to repeater ITL in the form of respectively corresponding line-loop interruptions. These line-loop interruptions restore and reoperate relay 221 to generate a series of ground impulses on wire 251. These ground impulses operate series relay S and series auxiliary relays AS sequentially. Relays S and AS remain operated throughout the series of impulses constituting the first digit by virtue of the indicated cooper sleeve on such relays rendering them slow-restoring. At the same time, these pulses energize the upper winding of impulse counter DR successively in accordance with the received digit value. Counter DR, being a device of the type shown in the U.S. Patent of R. P. Arthur, No. 2,736,845, actuates its armature sets in accordance with the energizations of the upper winding thereof.

On completion of the dialing of the first digit, the line-loop across line ITL is maintained closed and line relay 221 is held in an operated position. Since the interdigit interval between the first and second digit exceeds the holdover time of relay S, relay S restores and open-circuits relay AS. During the time interval, approximately 300 ms., when relay S is restored and relay AS is operated, wires TS and RS of digit register R2 is connected to respective wires 231 and 230 of counter DR. Within this time interval, solid ground or a polarized ground, by virtue of rectifier diodes D1 to D4, appears on control wires 231 and/or 230 depending upon the digit value recorded. This ground is projected to relays D1, D2, D4 or D8 of register R2 to provide an indication in the register of the value of the first digit. The ground markings on wires TS or RS are effective to operate one or more of the relays B1, B2, B4 or B8 according to the following table:

| Digit Value | Relay Operated | Wire Marked |
|---|---|---|
| 1 | B1 | AE. |
| 2 | B2 | BE. |
| 3 | B1, B2 | AB. |
| 4 | B4 | CE. |
| 5 | B1, B4 | AC. |
| 6 | B2, B4 | BC. |
| 7 | B4, B8 | CD. |
| 8 | B8 | DE. |
| 9 | B1, B8 | AD. |
| 0 | B2, B8 | BD. |

The above table also shows which wires in outgoing group OG are energized as a result of the register operation. These output wires correspond respectively to the output wire A to E of the register of the Leondard et al. application.

Assuming digit value "1" to have been dialed (although it would normally be absorbed as the first digit), ground is connected to wire 231 through rectifier D1. Thus, on negative half cycles of alternating current from transformer TR, current would readily flow through rectifier 412, the winding of relay B1 to cause output wires A and E of group OG to be energized. Negative cycles of alternating current are prevented from flowing through rectifier 411 as it is poled in opposition thereto. On positive half cycles, rectifier 411 conducts but rectifier D1 blocks the path to ground.

If digit value "2" were dialed, current would flow through rectifiers D2 and 411, operating relay B2 to ground wires B and E. For the digit value "3," solid ground appears on wire 231 and relays B1 and B2 would operate and hold as the release time thereof exceeds their operating time. For the digit value "4," rectifiers D3 and 414 conduct on positive half cycles and cause relay B4 to operate. For the digit value "5," current flows through rectifiers D3 and 414 on positive cycles, causing relay B4 to operate and flow through rectifiers D1 and 412 on negative cycles, causing relay B1 to operate. For the digit value "6," the circuit for relay B4 remains unchanged but a circuit is completed for relay B2 instead of B1 as rectifier pairs D2 and 412 conduct on positive half cycles instead of rectifier pairs D1 and 412 conducting on negative half cycles.

The operation of the recording relays in the register in response to the remaining digit values is apparent in view of the foregoing description of their operation for divid values 1 through 6.

Throughout the restoration and reoperation of line relay L in responding to the incoming pulses (line-loop interruptions) the ground on wire P is removed periodically according to the pulse-induced restorations of relay L. Relay L2 (Fig. 4) is restored and reoperated according to the ground pulses appearing on wire P. Contacts on relay L2 operate and maintain relays S2 and SH2 operated during the recording of a digit in repeater IR.

On completion of the dialing of the first digit, relays S2 and SH2 restore sequentially and, by contacts not shown, control register R2 to switch the output wires OG from the first digit store to the next, these digit stores being shown in the noted Leonard et al. application.

After the transmission of coded information over wires TS and RS, relay AS restores and at its contacts 1, completes a restoring circuit for counter DR through the operated contacts 1 of DR. When counter DR restores, the noted release circuit is opened and register IR is ready to receive the next digit.

The hereinbefore described sequence of operations recur for succeeding pulse trains of subsequent digits.

When the required number of digits is received, operations occur in register R2 causing the cutoff relay CT of selector S2 to operate and connect conductors T, R, and S of group 107 to corresponding wires of group 108. The access switch AS2 is restored isolating wires P, TS, and RS from register R2. This operation is as described in the noted Leonard et al. application.

In the event the incoming call is to a local subscriber, no additional incoming digit pulses are forthcoming and the calling trunk line ITL is connected to the called line through the hereinbefore-traced path shown in Fig. 1.

In the event the incoming call is a tandem call, to a further exchange, the incoming line ITL is connected to the desired outgoing trunk OTL of Fig. 1. The remaining digit impulse of the desired number in the distant exchange cause relay L to restore and operate as hereinbefore described and contacts 1 thereon open and restore a bridge circuit, including resistor 220, across the T and R conductors of group 108. In this way, the incoming loop pulses are repeated as loop pulses to the distant exchange.

In the event the called line or trunk is busy, register R2 causes relay BT to operate and return busy tone in the manner shown in the noted Leonard et al. application.

When the calling exchange releases the connection, trunk repeater IR is released in preparation for another call.

While I have described above the principles of my invention in connection with specific apparatus, it is to be clearly understood that this description is made only by way of example and not as a limitation to the scope of my invention.

I claim:

1. In an automatic telephone system for extending telephone connections between calling and called lines and trunks in response to successive series of digit impulses transmitted over calling ones of said lines and trunks, switching apparatus, digit-registering apparatus common to the lines and trunks for controlling the switching apparatus in accordance with the said series of digit impulses to establish the said telephone connections, trunk repeaters connected to respective trunks, access means controllable from a trunk repeater to establish a signalling connection between the digit-registering apparatus and the controlling trunk repeater, recording means in each trunk repeater for receiving and storing each series of digit impulses transmitted over the associated trunk and for operating the access means to establish the said signalling connection, and means responsive to the storage of each series of digit impulses for transmitting information indicative of the stored series over the signalling connection during the time interval between the said successive series.

2. In an automatic telephone system for extending telephone connections between calling and called lines and trunks in response to successive series of digit impulses transmitted over calling ones of the said lines and trunks, each series of impulses being representative of the numerical digit having a value equal to the number of the impulses in the series, switching apparatus, digit-registering apparatus common to the lines and trunks for controlling the switching apparatus in accordance with the said series of digit impulses to establish the said telephone connections, trunk repeaters connected to respective trunks, access means controllable from any trunk repeater to establish a signalling connection between the digit-registering apparatus and the controlling trunk repeater, recording means in each trunk repeater for receiving and storing the number of digit impulses in each series transmitted over the associated trunk and for operating the access means to establish the said signalling connection, and means responsive to the storage of each series of digit impulses for transmitting half cycles of alternating current in a code indicative of the number of stored pulses over the signalling connection during the time interval between the said successive series.

3. In an automatic telephone system for extending telephone connections between calling and called lines and trunks in response to successive series of digit impulses transmitted over calling ones of said lines and trunks, switching apparatus, digit-registering apparatus common to the lines and trunks for controlling the switching apparatus in accordance with the said series of digit impulses to establish the said telephone connections, trunk repeaters connected to respective trunks, access means controllable from any trunk repeater to establish a two-wire signalling connection between the digit-registering apparatus and the controlling trunk repeater, recording means in each trunk repeater for receiving and storing the number of digit impulses in each series transmitted over the associated trunk and for operating the access means to establish the said signalling connection, and means responsive to the said storage of digit impulses for transmitting information indicative thereof over the said two wires separately or in combination according to the number of stored impulses during the time interval between the said successive series.

4. In an automatic telephone system for extending telephone connections between calling and called lines and trunks in response to successive series of digit impulses transmitted over calling ones of said lines and trunks, switching apparatus, digit-registering apparatus common to the lines and trunks for controlling the switching apparatus in accordance with the said series of digit impulses to establish the said telephone connections, trunk repeaters connected to respective trunks, access means controllable from any trunk repeater to establish a signalling connection between the digit-registering apparatus and the controlling trunk repeater, recording means in each trunk repeater including an impulse counter operable in accordance with each impulse in a series for storing the number of digit impulses transmitted over the associated trunk and for operating the access means to establish the said signalling connection, and means responsive to the storage of each series of digit impulses for transmitting information indicative of the stored series over the signalling connection during the time interval between the said successive series and for restoring the operated impulse counter in preparation for counting the number of impulses in the next succeeding series.

No references cited.